United States Patent Office 2,784,221
Patented Mar. 5, 1957

2,784,221
METHOD OF CONVERTING ALDEHYDES INTO ACIDS

Carl Bordenca, Birmingham, Ala., assignor to Newport Industries, Inc., a corporation of Delaware No Drawing. Application May 14, 1953,
Serial No. 355,196

7 Claims. (Cl. 260—514)

This invention relates to a method for converting an aldehyde into the corresponding acid. More particularly, the invention relates to the conversion of aldehydes into corresponding acids by the use of air or other oxygen-containing gas and in the presence of an alkaline substance to facilitate the reaction to such an extent that it can be carried out at atmospheric pressure and at relatively low temperatures with high yields.

It has heretofore been known to convert an aldehyde into its corresponding acid by oxidation, but it has been customary to use a drier type catalyst. I have now found, however, that if the oxidation is carried out in the absence of a catalyst but in the presence of a finely divided, alkaline material, such as sodium carbonate, excellent yields are possible, using air as the oxidizing agent, even when the reaction is carried out at relatively low temperatures and at atmospheric pressure.

My method is particularly suited for use in the case of aldehydes formed by hydroformylation, for instance from terpenes and products derived from terpenes, whether monocyclic, bicyclic or acyclic. The aldehyde so formed is agitated with a finely divided, alkaline material and air blown through the mass until oxidation is substantially complete. The corresponding acid is formed in excellent yield.

It is therefore an object of this invention to provide a method of oxidizing aldehydes into their corresponding acids that is relatively simple, inexpensive and efficient.

It is a further important object of this invention to provide an improved method for forming acids from aldehydes produced by the hydroformylation of terpenes and products derived from terpenes.

Other and further important objects of this invention will become apparent from the following description and appended claims.

The starting material for use in carrying out my method may be any aldehyde, but I prefer to start with aldehydes that have been produced by hydroformylation, as for instance from monocyclic, bicyclic or acyclic terpenes. The starting aldehyde should preferably be substantially free from alcohols, since otherwise esterification would occur between the alcohol already present and the acid formed in situ from the aldehyde starting material.

As examples of the terpene and terpene-derived starting materials, the following are given: pinenes, menthenes and allo-ocimene. In my pending application Serial No. 316,563, filed October 23, 1952, I have described the preparation of acids from terpenes, going through the oxo reaction first to form aldehydes and then oxidizing the aldehydes to acids. The present method is particularly adapted to the conversion into acids of aldehydes so prepared and will be described in that connection.

In Examples I, II and III given below, a comparison is made between the process of my present invention (Example I) and the prior art processes (Examples II and III) as applied to the same starting material. The carboxaldehyde used in these three examples is one prepared in accordance with Example A of my aforesaid application, as follows:

EXAMPLE A

A charge of 409 parts of alpha-pinene and 8 parts of a cobalt salt of a terpane carboxylic acid (the cobalt salt of 3-menthane carboxylic acid) was added to a high pressure reactor. A mixture of carbon monoxide and hydrogen, in the ratio of 1 to 1 moles, was introduced into the reactor at 4000 pounds per square inch pressure; and the reaction mixture was heated to 130–140° C., with shaking, and maintained thus for six hours. The resulting product mixture was then subjected to Claisen distillation to obtain an 86% yield of the corresponding aldehyde (boiling at 54–70° C. at 2 mm. Hg).

*Example I.—Method exemplifying present invention using sodium carbonate*

212 grams of the carboxaldehyde of Example A were dissolved in 100 grams of naphtha, to which were added 8 grams of finely divided anhydrous sodium carbonate ($Na_2CO_3$). The mass was stirred so as to keep the sodium carbonate particles in suspension. Air was then passed through the mass at the rate of about 150 ml. per min. The temperature throughout was maintained at 40° C. After a period of 24 hours, the reaction was stopped and the reaction mass washed, first with dilute acid and then with water. The resulting mass was then distilled to separate the terpene-derived acid. The acid was obtained in 95% yield based upon the aldehyde, and had the following properties:

Specific gravity, $d_{20}^{15.5}$ _____ 0.9801
Refractive index, $n_D^{20}$ _____ 1.4660
Acid value _____ 302

*Example II.—Method exemplifying prior art using a manganese salt as catalyst*

In this example, a manganese salt of the acid produced in Example I was used in place of sodium carbonate.

To 169 grams of the carboxaldehyde of Example A were added 4.2 grams of the manganese salt just referred to. Air was passed through the mass at the rate of about 650 ml. per min. The temperature reached a maximum of 88° C. during the reaction. After 18 hours the reaction was stopped and the mass was steam-distilled to produce the corresponding acid. The yield of the acid was 31% based upon the starting carboxaldehyde. The proportion of high-boiling esters and of condensation products formed was much higher under the conditions of this example than those in Example I.

*Example III.—Method exemplifying prior art—no catalyst*

In this example, no catalyst and no alkaline substance was used.

A body of 85 grams of the same aldehyde of Example A was oxidized by passing air through it at the rate of about 70 to 100 ml. per min. for 66 hours with the temperature holding at about 76° C. During this period, the acid value of the material was found to rise to 136.2. On this basis, the yield would corresponding to a 59% conversion of the carboxaldehyde. The saponification number again showed an undesirably high yield of esters

Example IV

Finely dispersed air at a rate of 200 ml./min. was passed through a solution of 200 grams of 4,8-dimethyl-nonanal in 100 grams of naphtha containing 8 grams of sodium carbonate in suspension. After 44 hours the product was washed and distilled as in Example I to give an 83% yield of acid boiling at 152–4° C. 11 mm. Hg, $n_D^{20}$ 1.4395, $d_4^{15.5}$ 0.900.

Example V

Finely dispersed air was passed at a rate of 180 ml./hr. through a naphtha solution of 200 grams of aldehydes from the hydroformylation of mixed menthadienes. In the solution were suspended 8 grams of sodium carbonate. After 24 hours the product was washed and distilled as in Example I. The yield of acid was 92%, the product having $n_D^{20}$ 1.4660 and $d_4^{15.5}$ 0.980.

It is apparent from the foregoing examples that the oxidation of aldehydes into the corresponding acids can be carried out more efficiently and with better yields than heretofore by the use of an alkaline substance maintained in finely divided suspension in the aldehyde undergoing conversion. Although only sodium carbonate has been used in the examples, other alkaline substances such as the alkali metal oxides, hydroxides and carbonates and the alkaline earth metal oxides and hydroxides, magnesium oxide and hydroxide, can be used equally satisfactorily. It is not a question of maintaining a certain pH, since the system in which the alkaline substance is used is a substantially anhydrous single phase system. The alkaline material appears to prevent side reactions that would otherwise occur although the true function of the alkali is not well understood.

With regard to the conditions under which air oxidation of the aldehydes to acids can be carried out in accordance with my method, they can be varied considerably. The temperature is preferably maintained at between about 30 and 40° C., but can go as high as 75° C. without ill effect and can be lower than 30° C. except that the reaction becomes slower as the temperature used is lower. The pressure at which the reaction is carried out is preferably atmospheric but mainly so for convenience and for economic reasons. Higher or lower pressures can be used. Since there appears to be no sufficient advantage in using pure oxygen as the oxidizing agent, air is preferred, but any oxygen-containing gas can be employed.

The aldehyde can be dissolved or dispersed in any liquid medium that is inert toward the aldehyde, the reaction products and toward oxidation. The purpose of dissolving the aldehyde in naphtha, benzene or other solvent, is to reduce the viscosity of the aldehyde and facilitate stirring and aeration with finely divided air. If both the aldehyde and the acid produced therefrom are liquids that are not objectionably viscous, no solvent need be used.

We claim as our invention:

1. In the method of forming acids from aldehydes prepared by hydroformylating terpenes and terpene-derived products, the improvement which consists essentially of contacting said aldehydes in a substantially anhydrous single-phase liquid system and at a temperature not in excess of 75° C. with an oxygen-containing gas in the presence of a finely divided compound selected from the group consisting of alkali metal oxides, alkali metal hydroxides, alkali metal carbonates, alkaline earth metal oxides, alkaline earth metal hydroxides, magnesium oxide, and magnesium hydroxide.

2. The method of claim 1 in which said compound is sodium carbonate.

3. The method of claim 1 in which said finely divided compound is suspended in said system.

4. The method of claim 1 in which said aldehyde is dissolved in an inert solvent.

5. The method of converting a bicyclic terpane carboxaldehyde into the corresponding acid, which consists essentially in passing air therethrough at a temperature of 30 to 40° C. in the presence of a finely divided alkali metal carbonate suspended in said aldehyde.

6. The method of converting a bicyclic terpane carboxaldehyde into the corresponding acid, which consists essentially in passing air therethrough at a temperature below 75° C. in the presence of a finely divided alkali metal carbonate suspended in said aldehyde.

7. The method of converting a bicyclic terpane carboxaldehyde into the corresponding acid, which consists essentially in passing air therethrough at a temperature of 30 to 40° C. in the presence of finely divided sodium carbonate suspended in said aldehyde.

References Cited in the file of this patent

UNITED STATES PATENTS

| 1,284,887 | Gibbs | Nov. 12, 1918 |
| 2,288,566 | Herstein | June 30, 1942 |

FOREIGN PATENTS

| 586,383 | France | Jan. 5, 1925 |
| 732,720 | Germany | Mar. 10, 1943 |